United States Patent

[11] 3,620,917

[72] Inventor Robert Flaherty
 Pittsburgh, Pa.
[21] Appl. No. 874,749
[22] Filed Nov. 7, 1969
[45] Patented Nov. 16, 1971
[73] Assignee The United States of America as
 represented by the United States Atomic
 Energy Commission

[54] METHOD OF OPERATING A RADIOISOTOPE RADIATION SOURCE
 4 Claims, 3 Drawing Figs.
[52] U.S. Cl. .................................................. 176/39,
 136/202, 176/16, 23/203, 176/12
[51] Int. Cl. ........................................................ G21c 19/00
[50] Field of Search ............................................ 250/106;
 136/202; 176/10, 12, 16, 39; 252/301.1; 60/202,
 203

[56] References Cited
UNITED STATES PATENTS

| | | | |
|---|---|---|---|
| 3,329,532 | 7/1967 | Austin et al. | 176/39 |
| 3,347,711 | 10/1967 | Banks, Jr. et al. | 176/39 |
| 3,353,354 | 12/1967 | Friedman et al. | 176/39 |
| 3,309,277 | 3/1967 | Jaye et al. | 176/12 |
| 3,044,947 | 7/1962 | Payne, Jr. | 176/30 |

Primary Examiner—Reuben Epstein
Attorney—Roland A. Anderson

ABSTRACT: A method for conserving radioisotopic fuel such as cobalt-60 comprising initially loading a radiation source with a plurality of fuel elements wherein the outputs of the elements are of a decreasing succession with each element decaying to the original power output of a succeeding element in a uniform time interval. After each uniform time interval the least powerful element is replaced with an element having the same output as the original most powerful element. The replaced element is reprocessed by separating the decay products such as nickel-60 from the radioisotopic fuel.

PATENTED NOV 16 1971

3,620,917

INVENTOR.
Robert Flaherty
BY
Attorney:

METHOD OF OPERATING A RADIOISOTOPE RADIATION SOURCE

BACKGROUND OF THE INVENTION

The invention described herein was made in the course of, or under, a contract with the U.S. Atomic Energy Commission.

1. Field of the Invention

The invention relates generally to fuel management for radioisotopic sources and more specifically to a method of refueling a radioisotope heat source to reduce fuel consumption and to maintain a relatively constant power output. Cobalt-60 heat sources having a thermal output above about 1 kw. thermal, such as that described in copending U.S. application, Ser. No. 874,750 filed Nov. 7, 1969, would be particularly well suited for the operating method of the present invention.

2. Description of Prior Art

Heat and power sources employing atomic energy have used both the heat from fission in a nuclear reactor and the heat released with the decay of a radioisotope. Nuclear reactors have been designed to provide large quantities of power at a cost competitive to the cost of power produced by fossil fuels. The cost of power from radioisotopes has generally been greater than that of fissionable fuels, due to the expense of producing radioisotopes in a nuclear reactor. Small size sources, however, have been fueled with radioisotopes to avoid use of elaborate reaction rate controls.

The refueling of nuclear reactors is typically performed by shutting down the reactor and replacing all or part of the fuel. Replacement of fissionable fuels during operation presents difficult design and control problems as each fuel element generates and absorbs fission producing neutrons and thus can influence the fission rate of other fuel elements. Removal or addition of a fuel element during operation of an ordinary reactor could result in a nuclear excursion or loss of criticality. Furthermore, neutron flux variations in all or portions of a reactor will correspondingly affect the rate of fuel burn-up and accordingly fuel replacement may be required at variable time intervals.

Conversely, a definite mass fraction of a radioisotopic material will decay in a definite period of time. This decay pattern or rate is not substantially affected by environmental radiation or the presence of more or less mass of the radioisotope. Therefore a radioisotopic heat source is well suited for applications requiring long uniform periods of operation with minimum inspection or control.

Prior use of radioisotopic power sources have most often been in low-power applications such as $^{238}$Pu for weather satellite instrumentation or $^{90}$Sr for a light or transmitter on a navigational buoy. The power sources used in these applications have generally had power outputs less than about 1 kw. One reason for this restriction to low-power applications is the high cost of energy from radioisotopic fuels. Design of a suitable radioisotope power source has most often involved matching a radioisotope half life and radiation characteristics with the mission duration and character. However, as more powerful radioisotope sources are required, fuel economy becomes increasingly important.

Due to its declining power output a single radioisotope fuel charge must be selected and sized to provide sufficient power for a prescribed task at the end of a mission. The energy released in excess of this minimum power output during the mission is redundant and possibly must be removed to prevent overheating of the power source. The energy stored in the radioisotope and released after the duration of the mission is unavailable and therefore wasted. For purposes of illustration, FIG. 1 is a curve showing the decay characteristics of cobalt-60 (half life 5.26 years). The energy available or useful for a 5-year mission is represented by the rectangle bounded by the ordinate and abscissa axes, a vertical line through 5 years intersecting the decay curve and a horizontal line from that intersection to the abscissa axis. The shaded area under the curve and above the useful energy represents redundant energy. The crosshatched area under the curve and to the right of the useful energy represents the unavailable energy. It has been determined from the cobalt-60 decay curve that only about 34 percent of the total energy released by the decay of a single cobalt-60 fuel charge is available for use in a 5-year mission.

SUMMARY OF THE INVENTION

Therefore it is an object of the present invention to provide an improved and more economical radioisotopic fuel management method.

It is a further object to provide a method of operating a radioisotope power source to produce relatively constant power output.

It is also an object to provide a method of operating a $^{60}$Co power source with improved power economy and power output consistency.

In accordance with the present invention a method is provided for the fuel management of a radioisotope heat source comprising providing the source with a plurality of separately replaceable radioisotope fuel elements. The fuel elements are designed to have power outputs in a decreasing succession. After operating the heat source for a uniform period of time, each radioisotope fuel element decays to the original power output of the next succeeding fuel element. The fuel element having the lowest power output is replaced with a fuel element having a power output the same as the original most powerful element.

DESCRIPTION OF THE PREFERRED EMBODIMENT

One manner of improving the efficiency or amount of useful energy obtainable from a radioisotope fuel is to determine the optimum useful life of a single fuel element. The optimum life is that length of time a single radioisotope can be used to produce a maximum useful energy. This can be done by developing a mathematical relationship of useful energy with respect to fuel life and determining the fuel life providing the maximum useful energy. The optimum useful life can be shown to be equal to the reciprocal of the decay constant ($\lambda$) or the means life of the radioisotope.

Figure 1:
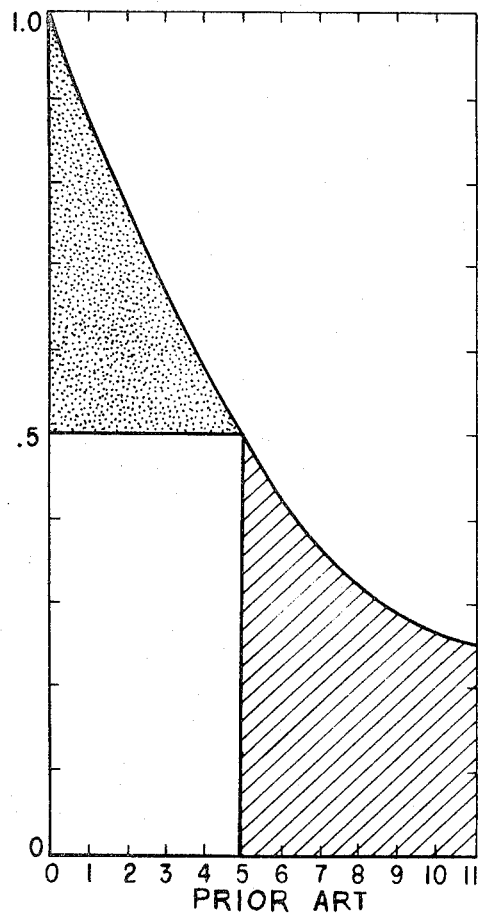
FIG. 1 is a cobalt-60 decay curve showing the useful, redundant and unavailable energy areas corresponding to a prior art method of operating a radioisotopic heat source.
Figure 2:
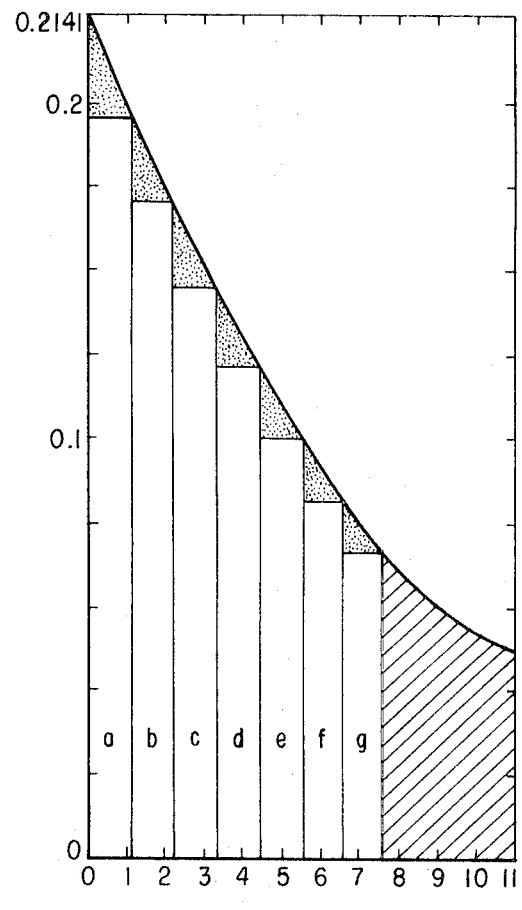
FIG. 2 is a cobalt-60 decay curve showing the useful, redundant and unavailable energy areas for a single fuel element corresponding to one method embodying the present invention.

The general equation for the decay curves shown in FIGS. 1 and 2 is:

$$P = P_o e^{-\lambda t} \qquad (1)$$

where:

$P$ is power output or energy per unit of time
$P_o$ is the original power output of the radioisotope
$\lambda$ is the decay constant or reciprocal time
$t$ is time
$e$ is the natural logarithm base The general equation for the area representing useful energy in FIG. 1 is therefore:

$$E_u = t P_o e^{-\lambda t} \qquad (2)$$

where:

$E_u$ is useful energy Differentiating with respect to time and selecting $P_o$ as unity:

$$\frac{dE_u}{dt} = e^{-\lambda t} - \lambda t e^{-\lambda t} \qquad (3)$$

or $$\frac{dE_u}{dt} = (1 - \lambda t)(e^{-\lambda t}) \qquad (4)$$

Setting the derivative equal to zero and solving for $t$ to determine the points of maximum and minimum $$1-\lambda t=0 \quad (5)$$
$$t=1/\lambda \quad (6)$$

By substituting values into equation 2 it can be seen that at $t=1/\lambda a \cdot E_u$ is at a maximum.

For cobalt-60, the optimum or mean life has been determined to be 7.6 years. The useful energy may be increased to a maximum of 36.8 percent of the total energy stored in the radioisotope by selecting the mean life of cobalt-60 for the length of the mission fueled by a single radioisotope element.

It has also been found that the useful energy can be increased at the expense of the redundant energy by using a plurality of fuel elements and replacing one or a group of fuel elements after a uniform time interval. For heat or power sources used in the polar regions, replacement about once every year in the summer may be convenient. Since the maximum useful energy a single fuel element can produce is obtainable in its means life, it is desirable to maintain each fuel element in the heat source for at least as long as its means life.

FIG. 2 shows the decay curve of cobalt-60 with the mean life of 7.6 years divided into 7 about 1.1 year increments; that is, a power source is contemplated in which one-seventh of the fuel elements are replaced about every 1.1 years. Accordingly each replacement fuel element remains in the source for 7.6 years or its mean life. FIG. 2 shows the allocation of redundant and useful energy for a single fuel element over its mean life or for each separate fuel element within the heat source during a single 1.1 year operating interval. The seven fuel elements are arranged so that they have the following relative power outputs at the beginning and end of each 1.1 year uniform time interval.

TABLE

| Fuel Element | Power | |
|---|---|---|
| | Initial | Final |
| a | 0.2141 | 0.1848 |
| b | 0.1848 | 0.1588 |
| c | 0.1588 | 0.1365 |
| d | 0.1365 | 0.1176 |
| e | 0.1176 | 0.1012 |
| f | 0.1012 | 0.0870 |
| g | 0.0870 | 0.0748 |
| Total | 1.000 | 0.8607 |

AFter the 1.1-year-time interval has passed, fuel element $g$ is removed and a new fuel element is installed having a power output of 0.2141 or the original power output of fuel element $a$. Since each of the remaining six fuel elements $a$–$f$ have decayed to the initial power output level of the next succeeding fuel element, this single fuel element replacement returns the heat source to its initial power output capability. For purposes of the table and FIG. 2 each remaining fuel element may assume the designation $b$–$g$ of the succeeding fuel element during the subsequent time interval.

The energy released by each fuel element $a$–$g$ during one uniform time interval (1.1 years in FIG. 2) is divided into redundant energy (shaded) and useful energy (clear). The unavailable energy remaining in the fuel element removed after a uniform time interval is represented by the cross-hatched area of FIG. 2. In this example the useful energy has been increased to 52.8 percent while the redundant energy has been decreased to about 10.4 percent. The unavailable energy is the same as in the case of the single fuel element used for the mean life of the radioisotope of 36.8 percent. If a larger number of fuel elements are used and each elements remains in the heat source for longer than the mean life, then a portion of the unavailable energy can be converted to useful energy. However, wide variation between the most and least active fuel elements may give rise to an excessive temperature unbalance in the heat source.

Replacement of the fuel elements may be made without terminating the operation of the heat source. As previously discussed, removal of a spent radioisotope fuel element or insertion of a new radioisotope fuel element will not change the pattern of decay of the radioisotopes within the heat source. Replacement during operation can, for example, be accomplished with the radioisotopic heat source described in the copending U.S. application Ser. No. 874,750 filed Nov. 7, 1969.

Figure 3:
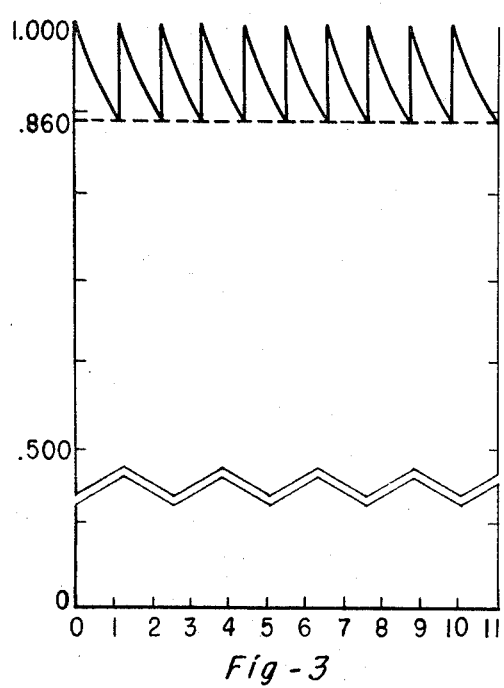
FIG. 3 is cummulative power output curve of a multiple fuel element, cobalt-60 heat source employing the method illustrated in FIG. 2.

From the table it can be seen that the total initial charge of radioisotope within the power source is the same as in the case of the single fuel element shown in FIG. 1. However, the power output with the present fuel management plan will not decay below about 0.86 percent of the original power output while the power output of the single fuel element system will at best energy economy decay to 36.8 percent of the original power output. FIG. 3 shows the power output of a cobalt-60 power source having one-seventh of its fuel elements replaced every 1.1 years as described.

It will be clear that the method of this invention is applicable to radioisotopes other than cobalt-60. Any radioisotope which decays according to equation 1 will have a maximum useful energy (36.8 percent) for a single radioisotope element used for its means life. The redundant energy can be transformed to useful energy as illustrated in FIG. 2 by using a plurality of fuel elements and replacing a fraction of the elements after each uniform time interval. The useful energy of any radioisotope may be further increased at the expense of the unavailable energy by maintaining each fuel element in the power source for a period in excess of the mean life. However, the amount of increase is not as significant as that gained by converting redundant to useful energy.

After a radioisotope fuel element has decayed to its means life it still has 36.8 percent of its original energy remaining. This energy may be recovered or reconcentrated by a number of methods. One manner of increasing the power density of a decayed fuel element is by removing the decay products.

Cobalt-60 decays to nickel-60 by giving off beta radiation. A typical fuel element may originally have an activity of 400 curies per gram and decay to about 146 curies per gram after 7.6 years. The original composition may be about 36% Co-59, 36% Co-60 and 28% Ni-60 and the depleted composition 36% Co-59, 13.2% Co-60 and 50.8% Ni-60. If Ni-60 is separated from the depleted mixture a resulting composition of 73.1% Co-59 and 26.1% Co-60 having an activity of 290 curies/gram can be formed. This composition is blended with more concentrated Co-60 to return its activity to 400 curies per gram or a larger portion is used in preparing a new fuel element to meet the power requirement. Likewise, the reprocessed fuel may be irradiated in a reactor or other source of neutrons to increase its activity.

Nickel can be separated form the cobalt by reacting the mixture with carbon monoxide at about 60° C. Nickel reacts with the carbon monoxide to form nickel carbonyl, a volatile compound which melts at about 25° C. and boils at about 43° C. The nickel carbonyl, therefore, immediately vaporizes as it forms. The equivalent cobalt compound, cobalt carbonyl, melts at about 51° C. and decomposes without vaporization at 52° C. Accordingly, the cobalt metal does not react with the carbon monoxide gas at 60° C. The carbonyl gas is driven off from the cobalt metal and is then separately heated to about 180° C. to decompose the gas into nickel powder and carbon monoxide gas. The carbon monoxide gas is recovered for further use. The remaining cobalt metal is refabricated into wafers for further use in radioisotopic fuel elements.

The present invention provides a method of employing a radioisotopic fuel to increase the useful energy extracted from the radioisotope. Redundant energy is correspondingly decreased to lessen the cooling problems within a radioisotopic power source. The variation in power output of the source can be minimized through use of the present method. Furthermore, the depleted fuel removed from the source can be reconcentrated by a chemical process to allow subsequent reemployment of the spent fuel.

What is claimed is:

1. A method of fuel management for a radioisotopic heat source comprising:
   a. initially charging said heat source with a number of separately replaceable radioisotope fuel elements having power outputs arranged in a decreasing succession such that each of said fuel elements, other than the element having the lowest power output, decays to the original power output of the next succeeding fuel element in a uniform time interval, said uniform time interval being approximately equal to the mean life of the radioisotope employed within said fuel elements divided by said number of fuel elements arranged in said decreasing succession;
   b. extracting heat for utilization from said heat source for said uniform time interval;
   c. after said uniform time interval, replacing only the fuel element having the lowest power output with a radioisotope fuel element having the same power output as the original most powerful element; and
   d. repetitively performing steps (b) and (c) to maintain each replacement fuel element within said heat source for about the mean life of said radioisotope.

2. The method of claim 1 wherein said radioisotopic heat source remains in service during the replacement of said fuel element.

3. The method of claim 1 wherein said radioisotopic fuel elements include cobalt-60 and have a mean life of 7.6 years.

4. The method of claim 3 wherein said replaced fuel element is reprocessed by reacting the replaced fuel element metals with carbon monoxide at a temperature of about 60° C. to produce nickel carbonyl gas and solid cobalt metal, collecting said nickel carbonyl gas, heating said nickel carbonyl gas to form nickel powder and carbon monoxide gas, recovering said carbon monoxide gas and cobalt metal, and reusing said cobalt metal in a replacement fuel element.

* * * * *